(12) United States Patent
Tasaka et al.

(10) Patent No.: US 10,427,688 B2
(45) Date of Patent: Oct. 1, 2019

(54) VEHICLE CONTROL SYSTEM

(71) Applicant: Mazda Motor Corporation, Aki-gun, Hiroshima (JP)

(72) Inventors: Mitsukazu Tasaka, Hiroshima (JP); Tadashi Saito, Hiroshima (JP); Shoji Imai, Higashihiroshima (JP); Yasunari Nakayama, Kure (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/973,097

(22) Filed: May 7, 2018

(65) Prior Publication Data

US 2018/0354521 A1 Dec. 13, 2018

(30) Foreign Application Priority Data

Jun. 8, 2017 (JP) ................... 2017-113531

(51) Int. Cl.
*B60W 10/02* (2006.01)
*B60W 10/18* (2012.01)
*B60W 30/192* (2012.01)
*B60W 30/20* (2006.01)
*F16H 61/04* (2006.01)

(52) U.S. Cl.
CPC .......... *B60W 30/192* (2013.01); *B60W 10/02* (2013.01); *B60W 10/18* (2013.01); *B60W 30/20* (2013.01); *F16H 61/04* (2013.01); *B60W 2510/1005* (2013.01); *B60W 2520/04* (2013.01); *B60W 2540/10* (2013.01);

(Continued)

(58) Field of Classification Search
CPC .... B60W 10/02; B60W 10/18; B60W 30/192; B60W 30/20; B60W 2520/04; B60W 2540/10; B60W 2540/12
See application file for complete search history.

(56) References Cited

U.S. PATENT DOCUMENTS

2005/0085984 A1* 4/2005 Uhler ................. B60K 31/0008
701/70
2013/0237373 A1* 9/2013 Kaneko .................. F16D 48/06
477/172

(Continued)

FOREIGN PATENT DOCUMENTS

JP 2008167540 A 7/2008

*Primary Examiner* — Edwin A Young
(74) *Attorney, Agent, or Firm* — Alleman Hall Creasman & Tuttle LLP

(57) ABSTRACT

A control system of a vehicle is provided, which includes an automatic transmission, a brake controller, and a processor configured to execute a neutral idle controlling module, a hydraulic pressure calculating module, a hydraulic pressure controlling module to calculate a target value of hydraulic pressure supplied to a frictional engageable element according to a given parameter, and a brake hold controlling module. The calculating module includes a first calculating submodule executed to calculate the target value in a period from an issuance of a vehicle start request when a neutral idle control is executed and a brake hold control is not executed in a vehicle stopped state until the frictional engageable element is engaged, and a second calculating submodule executed to calculate the target value so that a calculated value is lower than in the first calculation when the value of the parameter is the same.

7 Claims, 7 Drawing Sheets

(52) U.S. Cl.
CPC . *B60W 2540/12* (2013.01); *B60W 2710/1005* (2013.01); *B60W 2710/1083* (2013.01)

(56) References Cited

U.S. PATENT DOCUMENTS

2014/0214252 A1* 7/2014 Koike .................... B60Q 5/008
                    701/22
2016/0039421 A1* 2/2016 Kaneta ............. B60W 30/18118
                    477/73

* cited by examiner

VEHICLE CONTROL SYSTEM

TECHNICAL FIELD

The present disclosure relates to a vehicle control system, which performs a neutral idle control and a brake hold control, and is directed to a technical field of a vehicle drive control.

BACKGROUND OF THE DISCLOSURE

For an automatic transmission which transmits an engine output via a torque converter, a neutral idle control (hereinafter, simply referred to as "the neutral control") for automatically bringing the automatic transmission into a neutral state by controlling a frictional engageable element for a starting gear position to a disengaged state while a vehicle is stopped within a D-range (drive range or forward drive range), is known. When executing the neutral control, a turbine of the torque converter rotates following an engine operation at no load or an extremely low load; therefore, compared to the stopped state within a first gear range in which the turbine is fixed, the load of the torque converter and an engine load are reduced and fuel efficiency of the engine improves.

Further, as an art for reducing the burden on a vehicle driver while the vehicle is stopped due to traffic congestion or waiting for a traffic signal, a brake hold control for automatically holding a braking force even when the driver moves his/her foot from a brake pedal upon satisfaction of a given condition in the stopped state is known. The brake hold control is released when a traveling start request is issued by, for example, the driver's accelerator operation, and once the braking force is thus released, the vehicle is able to start.

JP2008-167540A discloses one example of an art relating to the brake hold control. Note that JP2008-167540A discloses an art for reducing energy loss by reducing creep torque under the execution of the brake hold control.

Incidentally, the present inventors found an issue that a shock easily occurs depending on a condition when starting a vehicle from a stopped state where the neutral control and the brake hold control described above are executed. This issue is described in detail with reference to FIGS. 6 and 7.

FIG. 6 is a time chart illustrating a conventional example of changes in various elements over time in a case where a vehicle is started from a stopped state where the neutral control is executed but the brake hold control is not executed.

As illustrated in FIG. 6, in the stopped state before time t11, by the execution of the neutral control (Part (b) of FIG. 6), between first and second frictional engageable elements for a starting gear position, the second frictional engageable element is engaged (Part (e) of FIG. 6) and the first frictional engageable element is subjected to a slip control (Part (c) of FIG. 6), so as to bring the automatic transmission substantially into a neutral state (Part (f) of FIG. 6). Here, since the brake hold control is not executed (Part (j) of FIG. 6), a brake operation is being performed by the driver (Part (h) of FIG. 6).

When starting the vehicle in this state, first, the brake operation is released (time t11 in Part (h) of FIG. 6), and then the accelerator operation is started (time t13 in Part (i) of FIG. 6). When the brake operation is released at time t11, the neutral control is accordingly released (Part (b) of FIG. 6). Thus, a gear change from the neutral state to the starting gear range is started, and hydraulic pressure into an engaging hydraulic pressure chamber of the first frictional engageable element in a slipping state rises (Part (d) of FIG. 6).

When performing the gear change to the starting gear position in this manner, in the first frictional engageable element, a difference between a rotational speed of an input-side element connected to the turbine of the torque converter and a rotational speed of an output-side element connected to wheels of the vehicle gradually decreases and, eventually, the torque transmission between the two elements begins. Since an output rotational speed O10 of the automatic transmission is zero until the vehicle starts traveling, an inputted rotational speed of the automatic transmission (turbine speed T10 at Part (1) of FIG. 6) gradually decreases until the engagement of the first frictional engageable element is completed.

At time t12, once the torque transmission at the first frictional engageable element is started, the output rotational speed O10 of the automatic transmission starts to increase (Part (m) of FIG. 6), and the vehicle starts to creep (Part (g) of FIG. 6). Then, at time t14, the first frictional engageable element is completely engaged (Part (c) of FIG. 6) in a state where the output rotational speed O10 of the automatic transmission increases to a rotational speed which is high to some extent (Part (m) of FIG. 6).

Therefore, the turbine speed T10 decreases relatively slowly until the first frictional engageable element is completely engaged since the supply of hydraulic pressure into the engagement hydraulic pressure chamber of the first frictional engageable element is started. As a result, the first frictional engageable element is engaged in a state where an input-side inertia is relatively small, and therefore, the shock from the engagement does not easily occur (Part (n) of FIG. 6).

On the other hand, FIG. 7 is a time chart illustrating a conventional example of changes in various elements over time in a case where a vehicle is started from a stopped state where the neutral control and the brake hold control are both executed.

In this case, as illustrated in FIG. 7, in the stopped state before time t21, the brake hold control is executed (Part (j) of FIG. 7) and the brake operation has already been released (Part (h) of FIG. 7). In this stopped state, the start of the accelerator operation (time t21 in Part (i) of FIG. 7) triggers a vehicle start request.

When an accelerator operation is started at time t21, the neutral control is released (Part (b) of FIG. 7). Thus, a gear change from the neutral state to the starting gear position is started, and hydraulic pressure into the engaging hydraulic pressure chamber of the first frictional engageable element rises (Part (d) of FIG. 7).

Moreover, at time t21, although the brake hold control is released (Part (j) of FIG. 7), the braking force applied by a hydraulic brake, etc. is not immediately released, the vehicle does not immediately start (Part (g) of FIG. 7), and an output rotational speed O20 of the automatic transmission does not immediately increase (Part (m) of FIG. 7).

Since the output rotational speed O20 remains zero until the braking force is actually released at time t22 after the brake hold control is released at time t21, the reduction of a turbine speed T20 (Part (1) of FIG. 7) for engaging the first frictional engageable element is performed sharply. Therefore, the inertia due to the decrease in the rotational speed on the input side tends to become large.

Then, at time t23, since the first frictional engageable element is engaged in the state where the inertia on the input side is relatively large (Part (c) of FIG. 7), the shock from this engagement easily occurs (a reference character X20 in Part (n) of FIG. 7). Particularly, for example, when a centrifugal pendulum damper for reducing vibration caused by suspending an operation of a cylinder of the engine is provided on a drive source side of the automatic transmission, an inertial mass at the input side of the first frictional engageable element increases and, therefore, it becomes easier for the shock from the engagement to occur.

SUMMARY OF THE DISCLOSURE

Therefore, the present disclosure is made in view of the above situations and aims to provide a vehicle control system, which effectively prevents, when a vehicle starts traveling from a stopped state where a neutral idle control and a brake hold control are executed, a shock caused by engaging a frictional engageable element for the vehicle start.

According to one aspect of the present disclosure, a control system of a vehicle is provided, which includes an automatic transmission having a frictional engageable element configured to be engaged when starting the vehicle to travel, a brake controller that is operated by a vehicle driver to apply a braking force to vehicle wheels, and a processor configured to execute a neutral idle controlling module to execute, when a given neutral idle condition is satisfied in a vehicle stopped state where a gear range of the automatic transmission is a traveling range, a neutral idle control in which the frictional engageable element is disengaged to bring the automatic transmission into a neutral state, and to release the neutral idle control when a vehicle start request is issued, a hydraulic pressure calculating module to calculate, while the neutral idle control is executed or when the neutral idle control is to be released, a target value of hydraulic pressure supplied to an engaging hydraulic pressure chamber of the frictional engageable element according to a value of a given parameter, a hydraulic pressure controlling module to control the hydraulic pressure supplied to the engaging hydraulic pressure chamber according to the target value calculated by the hydraulic pressure calculating module, and a brake hold controlling module to execute, when a given brake hold condition is satisfied in the vehicle stopped state, a brake hold control in which the braking force to the vehicle wheels is held regardless of the brake controller not being operated, and to release the brake hold control when the vehicle start request is issued. The hydraulic pressure calculating module includes a first calculating submodule executed to calculate the target value according to a first calculation, in a period from the issuance of the vehicle start request when the neutral idle control is executed and the brake hold control is not executed in the vehicle stopped state until the frictional engageable element is engaged, and a second calculating submodule executed to calculate the target value according to a second calculation configured so that a calculated value is lower than in the first calculation when the value of the given parameter is the same, in a period from the issuance of the vehicle start request when the neutral idle control and the brake hold control are executed in the vehicle stopped state until the frictional engageable element is engaged.

Note that the "disengaged" state of the frictional engageable element used herein includes a completely disengaged state and an engagement preparing state where the engagement is prepared within the extent that a drive force is not transmitted. The "engagement preparing state" used herein includes a slipping state and a small clearance state where a clutch clearance is extremely small.

Specific examples of the "given parameter" include a target value of an engaging torque of the frictional engageable element, an accelerator opening, a target value of a change rate of a turbine speed, an engine speed, a temperature of hydraulic oil of the automatic transmission, a slope of a road surface, etc.

Further, in a case where the "given parameter" includes a plurality of parameters, "when the value of the given parameter is the same" described above means that the values of all the parameters are the same.

Moreover, the "second calculation configured so that a calculated value is lower than in the first calculation when the value of the given parameter is the same" does not mean that the calculated value in the second calculation is "always" lower than that in the first calculation as long as the value of the given parameter is the same. That is, when the value of the given parameter is within a first range where a shock does not or does not easily occur from engaging the frictional engageable element, the calculated value in the second calculation may be equal to that in the first calculation, whereas, when the value of the given parameter is within a second range where the shock easily occurs from engaging the frictional engageable element, the calculated value in the second calculation may be lower than that in the first calculation. Note that as long as the value of the given parameter is the same, the calculated value in the second calculation does not become higher than that in the first calculation.

According to this configuration, when the vehicle starts from the vehicle stopped state where the neutral idle control is executed, by the frictional engageable element gradually shifting from the disengaged state to the engaged state, the gear change from the neutral state to a starting gear position is performed. In this configuration, regarding the calculation of the target value of the hydraulic pressure supplied to the engaging hydraulic pressure chamber of the frictional engageable element during the gear change to the starting gear position, the first calculation is used in the case where the brake hold control is not executed when the vehicle start request is issued, whereas in the case where the brake hold control is executed, the second calculation configured to calculate the target value lower than in the first calculation is used.

Therefore, according to this configuration, when the vehicle starts from the vehicle stopped state where the neutral idle control and the brake hold control are executed, by using the second calculation configured to calculate the lower target value to control the hydraulic pressure supply to the frictional engageable element, the engagement of the frictional engageable element is delayed. Thus, the engagement of the frictional engageable element is performed while gradually reducing a rotational speed of the drive source side thereof in a state where a rotational speed of a drive wheel side thereof is increased high to some extent. In this manner, the shock from engaging the frictional engageable element is effectively prevented compared to the case where the hydraulic pressure control is performed using the same calculation as when the vehicle starts from the vehicle stopped state where the brake hold control is not executed.

The first calculation may be configured so that the calculated target value becomes higher as an opening of an accelerator pedal increases. The second calculation may be configured so that the calculated target value becomes lower than in the first calculation within a given accelerator opening range.

According to this configuration, within the given accelerator opening range, since the hydraulic pressure supply to the frictional engageable element controlled by using the second calculation is reduced compared to the case of using the first calculation, the above effect is obtained.

Within the given accelerator opening range, a difference between the target value obtained in the first calculation and the target value obtained in the second calculation may increase as the accelerator opening decreases.

According to this configuration, within the given accelerator opening range, a reduction amount of the hydraulic pressure due to using the second calculation increases as the accelerator opening is smaller and a shock sensitivity is higher. Therefore, the shock a person on board feels is effectively prevented.

The control system may further include a brake hold controller that is operated by the vehicle driver to select one of permission and refusal of execution of the brake hold control.

According to this configuration, the above effects are obtained when the execution of the brake hold control is permitted by the brake hold controller.

A centrifugal pendulum damper may be provided in a drive force transmission path extending from a drive source to the frictional engageable element.

According to this configuration, since the centrifugal pendulum damper is provided on the drive source side of the frictional engageable element, in a case where an inertial mass of the drive source side increases, the inertia is effectively reduced as described above. Therefore, the shock from engaging the frictional engageable element is effectively prevented.

The automatic transmission may be connected to the drive source via a torque converter. The centrifugal pendulum damper may be provided inside a casing of the torque converter.

According to this configuration, by disposing the centrifugal pendulum damper in the casing of the torque converter, the above effects are obtained while a drive system of the vehicle is minimized.

The drive source may include a cylinder-activation control engine including a plurality of cylinders and suspendable of one or some of the cylinders.

According to this configuration, the above effects are obtained while the centrifugal pendulum damper prevents an increase of vibration caused by suspending an operation of the one or some of the cylinders of the engine.

DETAILED DESCRIPTION OF THE DISCLOSURE

Hereinafter, one embodiment of the present disclosure is described with reference to the accompanying drawings.
[Overall Configuration]

Figure 1:
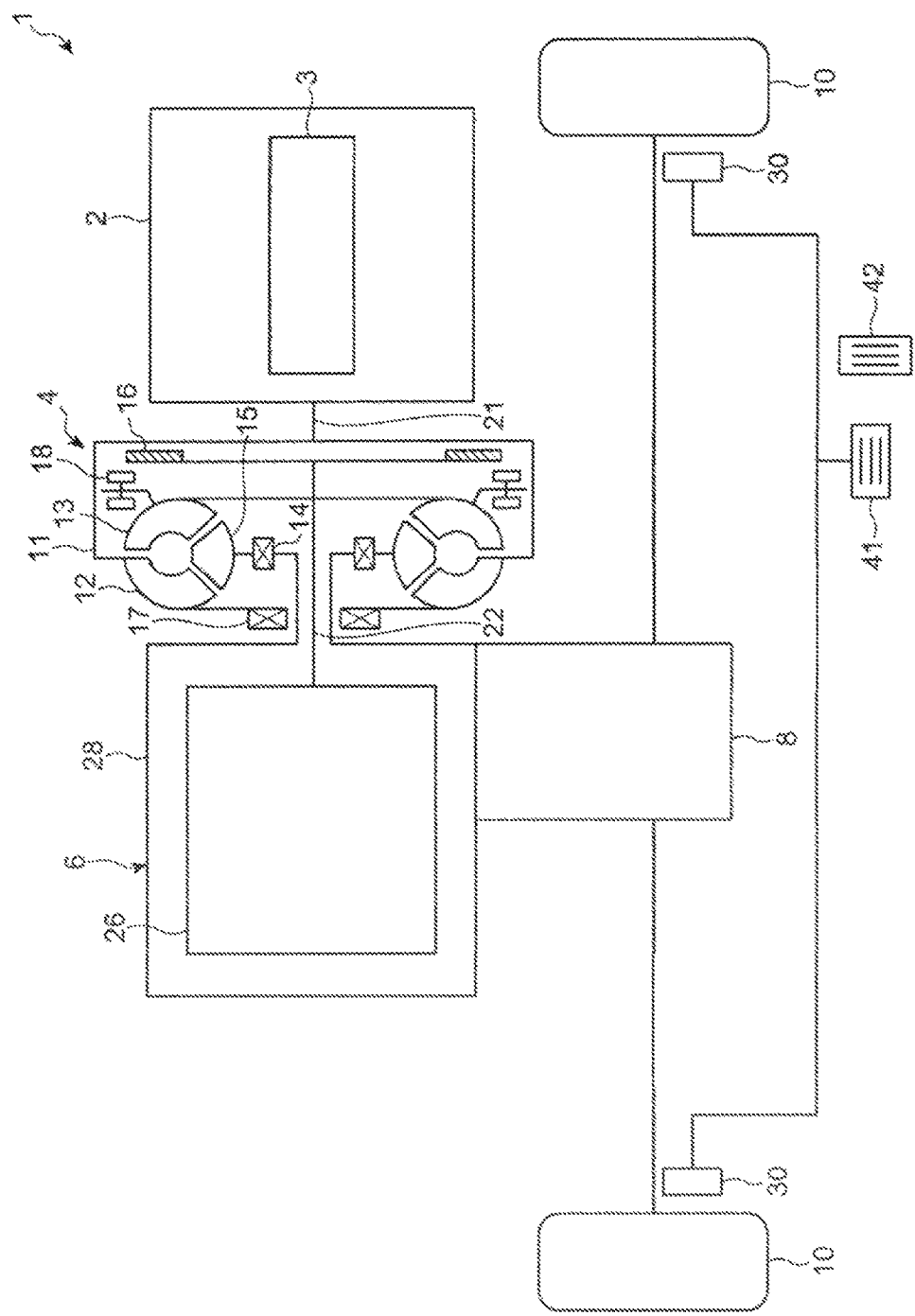
FIG. 1 is an overall view schematically illustrating a drive system of a vehicle according to one embodiment of the present disclosure.

FIG. 1 is an overall view schematically illustrating a drive system of a vehicle 1 including a control system according to one embodiment of the present disclosure. As illustrated in FIG. 1, the vehicle 1 includes an engine 2 as a drive source, a torque converter 4 as a fluid coupling, an automatic transmission 6 which changes an output torque of the engine 2 transmitted via the torque converter 4.

Note that although FIG. 1 illustrates a so-called transversely-placed drive system in which the engine 2, the torque converter 4, and the automatic transmission 6 are arranged in width directions of the vehicle, the drive system of the vehicle 1 may be vertically placed so that the engine 2, the torque converter 4, and the automatic transmission 6 are arranged in front-and-rear directions of the vehicle.

The engine 2 is a reciprocating engine having a plurality of cylinders (not illustrated) and a crankshaft 21. Further, the engine 2 is a cylinder-activation control engine including a cylinder suspending mechanism 3 which suspends operation of one or some of the cylinders. That is, the engine 2 is switchable between an all-cylinder operation in which all the cylinders are operated and a reduced-cylinder operation in which the operation of one or some of the cylinders are suspended by the cylinder suspending mechanism 3. A known mechanism is adopted as the cylinder suspending mechanism 3. A specific configuration of the cylinder suspending mechanism 3 is not particularly limited and, thus, the description thereof is omitted.

The torque converter 4 includes a casing 11 connected to the crankshaft 21 of the engine 2, a pump 12 fixed to the casing 11 and which rotates integrally with the crankshaft 21, a turbine 13 disposed facing the pump 12 and which is driven by the pump 12 via fluid, and a stator 15 disposed between the pump 12 and the turbine 13 and having a torque increasing function.

The stator 15 is supported to a transmission case 28 (described later) of the automatic transmission 6 via a one-way clutch 14. The rotation of the turbine 13 is transmitted, as an output rotation of the torque converter 4, to a transmission mechanism 26 (described later) of the automatic transmission 6 via a turbine shaft 22.

Further, the torque converter 4 includes a lockup clutch 16 which couples the casing 11 at its input side, to the turbine 13 at its output side. By the lockup clutch 16 coupling the casing 11 to the turbine 13, the crankshaft 21 is directly connected to the turbine 13 and the turbine shaft 22.

A mechanical oil pump 17 is further connected to the casing 11 of the torque converter 4. The oil pump 17 is driven by the engine 2 via the torque converter 4. Hydraulic oil discharged from the oil pump 17 is used for a hydraulic control of frictional engageable elements (not illustrated) of the transmission mechanism 26, lubrication of various parts, a hydraulic control of the lockup clutch 16, etc.

A centrifugal pendulum damper 18 as a dynamic vibration absorber which absorbs vibration of the engine 2 is also provided in a drive force transmission path extending from the engine 2 to the transmission mechanism 26. The centrifugal pendulum damper 18 is attached, for example, to the turbine 13 of the torque converter 4 so as to be swingable around its axis.

The centrifugal pendulum damper 18 includes a plurality of centrifugal pendulum dampers and they are arranged at a given interval in a circumferential direction of the torque converter 4. The plurality of centrifugal pendulum dampers 18 are disposed in the casing 11 of the torque converter 4. Thus, the drive system of the vehicle 1 is minimized. A specific configuration of each centrifugal pendulum damper 18 is not particularly limited, and thus, the description thereof is omitted.

The centrifugal pendulum damper 18 absorbs the vibration transmitted from the engine 2, by its mass body swinging around the axis in relation to the turbine 13. Especially, large vibration transmitted from the engine 2 performing the reduced-cylinder operation is effectively absorbed by the centrifugal pendulum damper 18. Further, when the lockup clutch 16 is engaged, the centrifugal pendulum damper 18 effectively absorbs the vibration, which is directly transmitted to the turbine 13, from the engine 2 side without using the fluid.

The automatic transmission 6 includes the multi-step transmission mechanism 26 and the transmission case 28 accommodating the transmission mechanism 26. The transmission mechanism 26 has a plurality of frictional engageable elements (not illustrated). The transmission mechanism 26 achieves a desired gear position by selectively engaging the plurality of frictional engageable elements. The output rotation of the transmission mechanism 26 is transmitted to left and right drive wheels 10 via a differential 8.

In this embodiment, a plurality of gear positions are achievable by the transmission mechanism 26 by engaging two frictional engageable elements. Below, the two frictional engageable elements which achieve a first gear range, which is a starting gear position, are referred to as "first frictional engageable element" and "second frictional engageable element," respectively.

Figure 2:
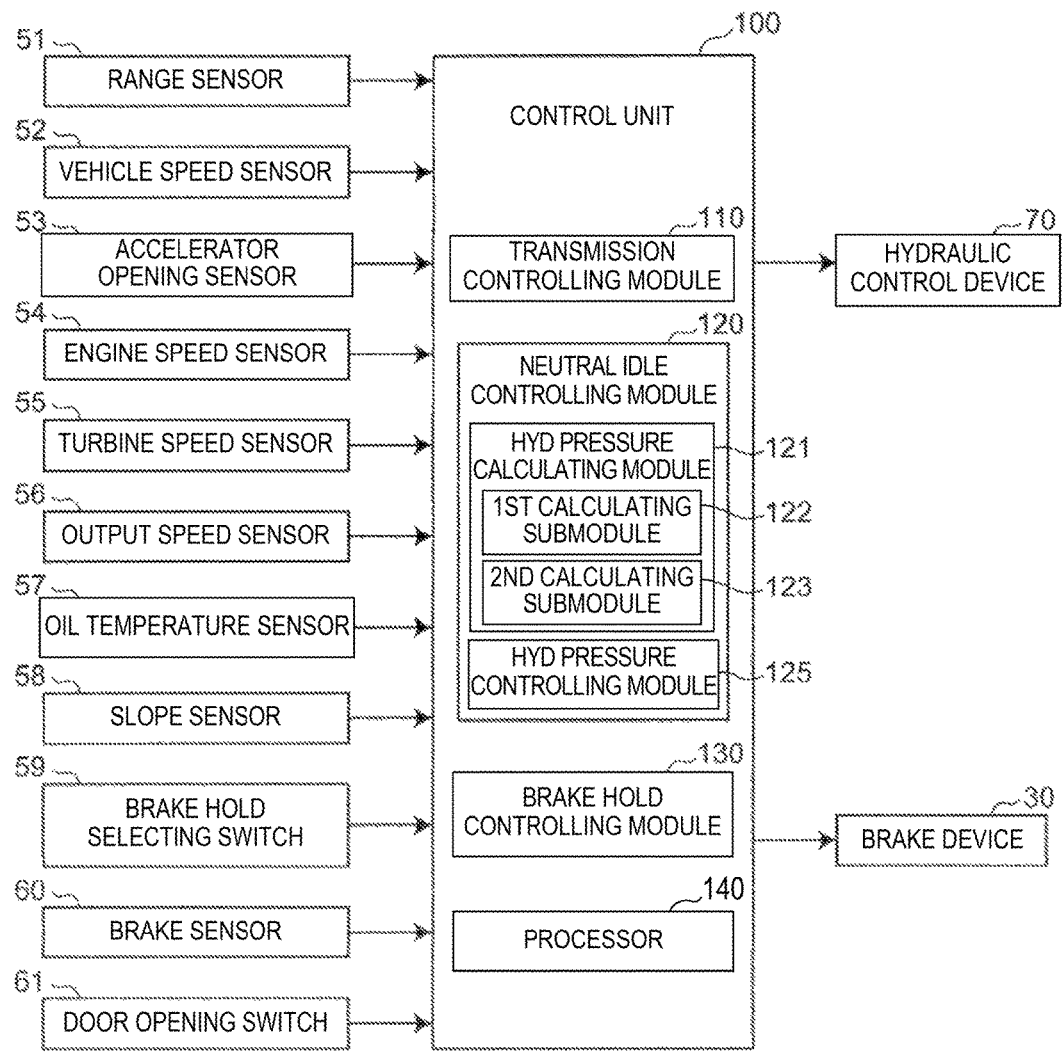
FIG. 2 is a system diagram of a control system of the vehicle according to the embodiment of the present disclosure.

An engaging hydraulic pressure chamber (not illustrated) is formed in each frictional engageable element, and the hydraulic pressure supplied to the engaging hydraulic pressure chamber is controlled by a hydraulic control device 70 (see FIG. 2). The hydraulic control device 70 controls a flow of the hydraulic oil supplied from the oil pump 17 to a hydraulic pressure supply circuit and its hydraulic pressure, by a hydraulic control valve, a switch valve, etc. provided in the hydraulic pressure supply circuit. As a result, the frictional engageable elements are controlled among the engagement, disengagement, and slipping, by controlling the hydraulic pressure in the engaging hydraulic pressure chamber of each frictional engageable element.

The vehicle 1 includes brake devices 30 which apply a braking force to all vehicle wheels including the drive wheels 10 or some of the vehicle wheels. The brake device 30 is, for example, a hydraulic brake which applies the braking force with hydraulic pressure (e.g., oil pressure). The brake device 30 applies the braking force to the wheels by supplying the hydraulic pressure corresponding to a depressing operation of a brake pedal 41 by a vehicle driver.

Further, the brake device 30 holds the hydraulic pressure even when the operation of the brake pedal 41 is released when a brake hold control (described later) is executed in a stopped state of the vehicle. Thus, while the brake hold control is executed, the braking force applied to the wheels by the brake device 30 is held even without depressing the brake pedal 41.

Note that the brake device 30 may include an electric brake in addition to or instead of the hydraulic brake. In this case, by operating the electric brake when executing the brake hold control, even if the hydraulic pressure of the hydraulic brake drops due to releasing the brake operation, the braking force due to the decrease of the hydraulic pressure is prevented from decreasing.

[Control System]

As illustrated in FIG. 2, the control system of the vehicle 1 of this embodiment includes a control unit 100 which performs various controls of the vehicle 1. The control unit 100 is configured, for example, by having a microprocessor as a main part. The control unit 100 includes a processor 140 (i.e., a central processing unit (CPU)), memory comprised of, for example, RAM(s) and ROM(s), and an input/output interface circuit.

The control unit 100 includes a transmission controlling module 110 which controls a gear change of the automatic transmission 6, a neutral idle controlling module 120 which performs a neutral idle control (described later), and a brake hold controlling module 130 which performs the brake hold control (described later). These modules are software stored in memory and executed by the processor 140 to achieve their respective functions.

Various external signals used for controlling the vehicle 1 are inputted to the control unit 100. A specific example of the input signals to the control unit 100 includes detection signals from a range sensor 51 which detects a gear range selected by the driver, a vehicle speed sensor 52 which detects a traveling speed of the vehicle 1, an accelerator opening sensor 53 which detects an accelerator opening (a depressed amount of an accelerator pedal 42), an engine speed sensor 54 which detects a speed of the engine 2, a turbine speed sensor 55 which detects a rotational speed of the turbine 13 of the torque converter 4 (an input rotational speed of the transmission mechanism 26), an output speed sensor 56 which detects an output rotational speed of the transmission mechanism 26, an oil temperature sensor 57 which detects a temperature of the hydraulic oil used for the hydraulic control of the automatic transmission 6, a slope sensor 58 which detects a slope of a road surface on which the vehicle 1 is located, a brake hold selecting switch 59 which is controlled by the driver to select one of permission and refusal of execution of the brake hold control, a brake sensor 60 which detects the depression of the brake pedal 41, and a door opening switch 61 which detects that a door of the vehicle 1 for a driver's seat is opened.

[Transmission Control]

The transmission controlling module 110 of the control unit 100 outputs a control signal to the hydraulic control device 70 of the automatic transmission 6 based on the various input signals. Thus, the hydraulic control device 70 controls the frictional engageable element of the transmission mechanism 26, and thus, controls the gear change of the automatic transmission 6.

The control by the transmission controlling module 110 uses, for example, the input signals from the range sensor 51, the vehicle speed sensor 52, the accelerator opening sensor 53, the engine speed sensor 54, the turbine speed sensor 55, the output speed sensor 56, the oil temperature sensor 57, and the slope sensor 58.

More specifically, the transmission controlling module 110 controls, for example, the opening and/or the output pressure of the hydraulic control valve provided in the hydraulic control device 70 according to the selected gear range and an operating state of the vehicle 1. Thus, the frictional engageable element of the transmission mechanism 26 is engaged, released, or subjected to a slip control, so as to control the gear change of the automatic transmission 6.

[Neutral Idle Control]

The neutral idle controlling module 120 of the control unit 100 outputs a control signal to the hydraulic control device 70 based on the various input signals to execute the following neutral idle control (hereinafter, also simply referred to as "neutral control").

The neutral control brings the automatic transmission 6 into a neutral state while the vehicle is stopped within a D-range (forward traveling range) in order to improve fuel efficiency of the engine 2. The neutral control is executed when a given neutral idle condition is satisfied.

For example, the neutral idle condition includes satisfying all of the D-range being selected, the vehicle speed being zero, the brake pedal 41 being depressed or the brake hold control (described later) being executed, the accelerator pedal 42 being released (the accelerator opening being zero), an idle stop of the engine 2 not being executed, an absolute value of the slope of the road surface being less than a given value (e.g., 5%), the temperature of the hydraulic oil used for the hydraulic control by the hydraulic control device 70 being equal to or higher than a given temperature (e.g., 40° C.).

The control by the neutral idle controlling module 120 uses, for example, the input signals from the range sensor 51, the vehicle speed sensor 52, the brake sensor 60, the accelerator opening sensor 53, the engine speed sensor 54, the slope sensor 58, and the oil temperature sensor 57.

The neutral idle controlling module 120 includes a hydraulic pressure calculating module 121 which calculates target values of hydraulic pressure supplied to the engaging hydraulic pressure chambers (not illustrated) of the first and second frictional engageable elements according to a value of a given parameter while the neutral control is executed or when the neutral control is to be released, and a hydraulic pressure controlling module 125 which controls the hydraulic pressure supplied to the engaging hydraulic pressure chamber according to the target values calculated by the hydraulic pressure calculating module 121.

The hydraulic pressure calculating module 121 includes a first calculating submodule 122 which performs a first calculation (described later), and a second calculating submodule 123 which performs a second calculation (described later), as modules which calculate a target value of the hydraulic pressure supplied to the engaging hydraulic pressure chamber of the first frictional engageable element when the neutral control is released. One of the first calculation and the second calculation is selectively performed depending on whether the brake hold control (described later) is executed immediately before the release of the neutral control is started. Specific configurations of the first calculation and the second calculation will be described later.

When the neutral control is executed, between the first and second frictional engageable elements which are engaged within the first gear range which is immediately before the neutral control starts, the second frictional engageable element is kept engaged and the first frictional engageable element is disengaged to achieve the neutral state. Here, the disengagement of the first frictional engageable element may be achieved by a substantial disengagement in which the drive force transmission by the first frictional engageable element is interrupted, and not necessary be a complete disengagement.

For example, the disengagement is achieved by the slip control in which the drive force transmission is interrupted, and thus, a response of the vehicle 1 to start traveling improves. Note that the neutral state may be achieved by completely disengaging the first frictional engageable element.

When the neutral control is executed while the vehicle is stopped, the automatic transmission 6 is brought into the neutral state, and thus the turbine 13 of the torque converter 4 rotates following the engine 2 with no load or extremely low load. Thus, compared to the stopped state within the first gear range in which the turbine 13 is fixed, the loads of the torque converter 4 and the engine 2 are reduced and the fuel efficiency of the engine 2 is improved.

The neutral control is released when a traveling start request (simply, start request) for the vehicle 1 is issued by the driver and when another given releasing condition is satisfied.

Specific examples of the start request for the vehicle 1 include the driver removing his/her foot from the brake pedal 41 in a state where the brake hold control is not executed, and the accelerator pedal 42 being depressed in a state where the brake hold control is executed. Specific examples of the other releasing condition include switching the gear range from the D-range to another range, and starting the idle stop of the engine 2.

When the neutral control is released in response to the start request for the vehicle 1, the first frictional engageable element is engaged as a result of the hydraulic control by the hydraulic control device 70, and thus, the gear changes from the neutral state to the starting gear position. A specific example of the control of the first frictional engageable element by the neutral idle controlling module 120 will be described later.

[Brake Hold Control]

The brake hold controlling module 130 of the control unit 100 performs the following brake hold control by outputting a control signal to the brake device 30 based on the various input signals.

The brake hold control automatically holds the braking force to the wheels without depressing the brake pedal 41 in order to reduce a burden on the driver while the vehicle is stopped due to a traffic congestion or waiting for a traffic signal. The brake hold control is executed when a given brake hold condition is satisfied in the stopped state.

The brake hold condition includes satisfying all of the brake hold selecting switch 59 being ON (the execution of the brake hold control being permitted by the driver), the vehicle speed being zero, the brake pedal 41 being depressed, the accelerator pedal 42 being released (the accelerator opening being zero), the door for the driver's seat being closed, and a range other than a R-range (reverse traveling range) being selected or the R-range being selected on a downhill road surface.

The control by the brake hold controlling module 130 uses, for example, the input signals from the brake hold selecting switch 59, the vehicle speed sensor 52, the brake sensor 60, the accelerator opening sensor 53, the door opening switch 61, the range sensor 51, and the slope sensor 58.

When the brake hold control is executed, the brake device 30 is controlled to hold the braking force around a level which is able to keep the stopped state even without the brake pedal 41 being depressed. For example, the brake device 30 is controlled so that the hydraulic pressure supplied to the brake device 30 according to the depression of the brake pedal 41 immediately before the execution of the brake hold control is also held after the depression of the brake pedal 41 is released.

The brake hold control is released when the start request for the vehicle 1 is issued by the driver and when another given releasing condition is satisfied.

During the execution of the brake hold control, the depression of the accelerator pedal 42 triggers the start request for the vehicle 1. That is, the depression of the accelerator pedal 42 causes the release of the brake hold control. Specific examples of the other releasing condition include the brake hold selecting switch 59 being turned off in the state where the brake pedal 41 is depressed, the door for the driver's seat being opened, and the gear range being switched to the R-range on a flat (no slope) or uphill road surface.

When the brake hold control is released in response to the start request for the vehicle 1, the supply of the hydraulic pressure to the brake device 30 is stopped. Thus, when the application of the braking force to the wheels is released, the vehicle 1 starts traveling.

[Control of First Frictional Engagement Element]

One example of the control of the first frictional engageable element by the neutral idle controlling module 120 is described in more detail with reference to a flowchart illustrated in FIG. 3.

Figure 3:
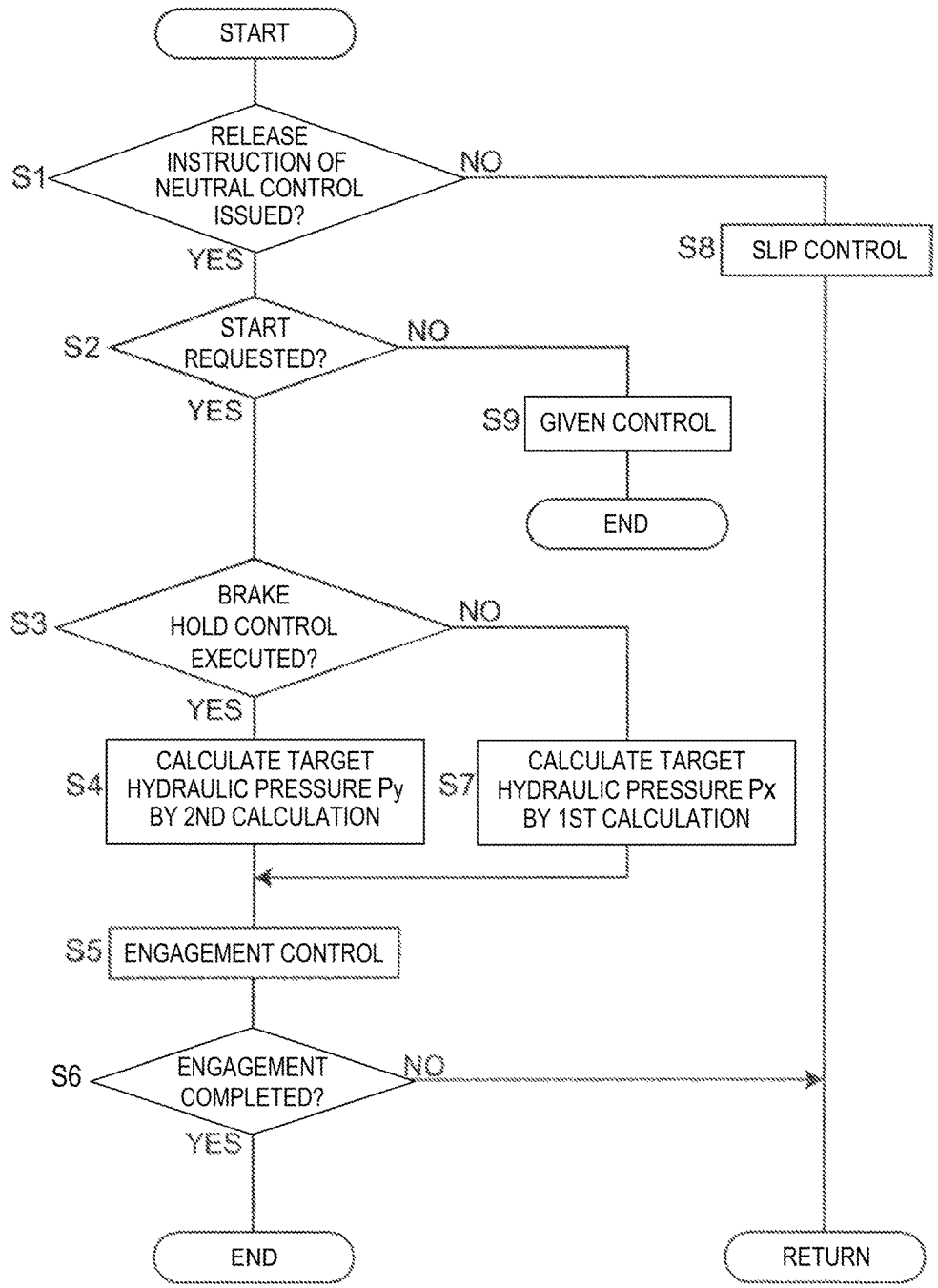
FIG. 3 is a flowchart illustrating a control example of a first frictional engageable element by a neutral idle controlling module.

The control operation illustrated in FIG. 3 is repeated, while the vehicle is stopped, from the start of the neutral control until the release of the neutral control is completed. During this repetition, the second frictional engageable element is kept engaged.

Firstly, at S1, whether a release instruction of the neutral control is issued is determined. The release instruction of the neutral control is issued when the start request for the vehicle 1 is issued or when the other given releasing condition is satisfied.

If the release instruction of the neutral control is not issued as a result of S1, at S8, the slip control of the first frictional engageable element is executed to continue the neutral control. At S8, the first frictional engageable element is controlled to slip to an extent that the torque transmission is not performed, and thus, the automatic transmission 6 is brought into a substantially neutral state.

If the release instruction of the neutral control is issued as a result of S1, at S2, whether the release instruction of the neutral control is based on the start request for the vehicle 1 is determined.

If the release instruction of the neutral control is based on a satisfaction of another condition other than the start request for the vehicle 1 as a result of S2, at S9, a given control according to the releasing condition is executed. For example, in a case of releasing the neutral control by switching the gear range from the D-range to the R-range, at S9, the gear is changed to a reverse gear range of the automatic transmission 6.

If the release instruction of the neutral control is triggered by the start request for the vehicle 1 as a result of S2, a determination of S3 is performed.

At S3, whether the brake hold control is executed as well as the neutral control when the start request for the vehicle 1 is issued is determined.

If the neutral control is executed while the brake hold control is not executed as a result of S3, at S7, the first calculating submodule 122 calculates a target value Px of the hydraulic pressure supplied to the engaging hydraulic pressure chamber of the first frictional engageable element to engage the first frictional engageable element. The method of calculating the target hydraulic pressure Px by the first calculating submodule 122 will be described later.

If the start request for the vehicle 1 is issued in the state where the brake hold control is executed as well as the neutral control as a result of S3, at S4, the second calculating submodule 123 calculates a target value Py of the hydraulic pressure supplied to the engaging hydraulic pressure chamber of the first frictional engageable element. The method of calculating the target hydraulic pressure Py by the second calculating submodule 123 will be described later.

Once the target values Px or Py of the hydraulic pressure supplied to the engaging hydraulic pressure chamber of the first frictional engageable element are calculated by the first calculating submodule 122 or the second calculating submodule 123 (S4 or S7), at S5, the hydraulic control device 70 is controlled by the hydraulic pressure controlling module 125 so that the hydraulic pressure according to the target values Px or Py is supplied to the engaging hydraulic pressure chamber. Thus, the engaging operation of the first frictional engagement element is controlled.

At the following S6, whether the engagement of the first frictional engageable element is completed is determined. If the engagement of the first frictional engageable element is not completed as a result of S6, the braking operation of FIG. 3 is repeated until the engagement is completed.

Therefore, from the issuance of the release instruction of the neutral control by the start request for the vehicle 1 until the engagement of the first frictional engagement element is completed, the calculation of the target hydraulic pressures Px or Py by the first calculating submodule 122 or the second calculating submodule 123 is repeated (S4 or S7), and every time the calculation is performed, the hydraulic pressure control according to the calculated value is executed by the hydraulic pressure controlling module 125 (S5).

Thus, the hydraulic pressure supplied to the engaging hydraulic pressure chamber of the first frictional engageable element gradually increases, and eventually, the engagement of the first frictional engageable element is completed. By the completion of the gear change from the neutral state to the starting gear position in this manner, the release of the neutral control is completed.

[First Calculation]

As described above, the first calculating submodule 122 calculates the target hydraulic pressure Px when the start request for the vehicle 1 is issued in the stopped state where the neutral control is executed and the brake hold control is not executed.

The first calculating submodule 122 calculates the target value Px of the hydraulic pressure supplied to the engaging hydraulic pressure chamber of the first frictional engageable element while the first frictional engageable element shifts from the slipping state to the engaged state, according to the first calculation.

The control of the gear change from the neutral state to the starting gear position by the neutral idle controlling module 120 is executed while suitably calculating various target values including the target value of the engaging torque of the first frictional engageable element and the target value of the change rate of the turbine speed (the inputted rotational speed of the transmission mechanism 26).

While such a gear change is executed, in the first calculation by the first calculating submodule 122, a first hydraulic pressure base value Xa is calculated based on the target value of the engaging torque of the first frictional engageable element, a second hydraulic pressure base value Xb is calculated based on the target value of the change rate of the turbine speed (the inputted rotational speed of the transmission mechanism 26), and a third hydraulic pressure base value Xc is calculated based on the engine speed.

Further, in the first calculation, the target hydraulic pressure Px is calculated by performing a given calculation based on the first, second and third hydraulic pressure base values Xa, Xb, and Xc. Note that in the first calculation, various corrections may be performed in addition to the calculation based on the first, second and third hydraulic pressure base values Xa, Xb, and Xc. Specific examples of the correction include a correction according to the temperature of the hydraulic oil, a correction according to the slope of the road surface, a correction by a learning control, and a correction by a feedback control.

Further, in the first calculation, the correction according to the accelerator opening is performed in the calculation of the first hydraulic pressure base value Xa. In this correction, a first correction hydraulic pressure value Xa1 corresponding to the accelerator opening is suitably added to the first hydraulic pressure base value Xa.

Figure 4:
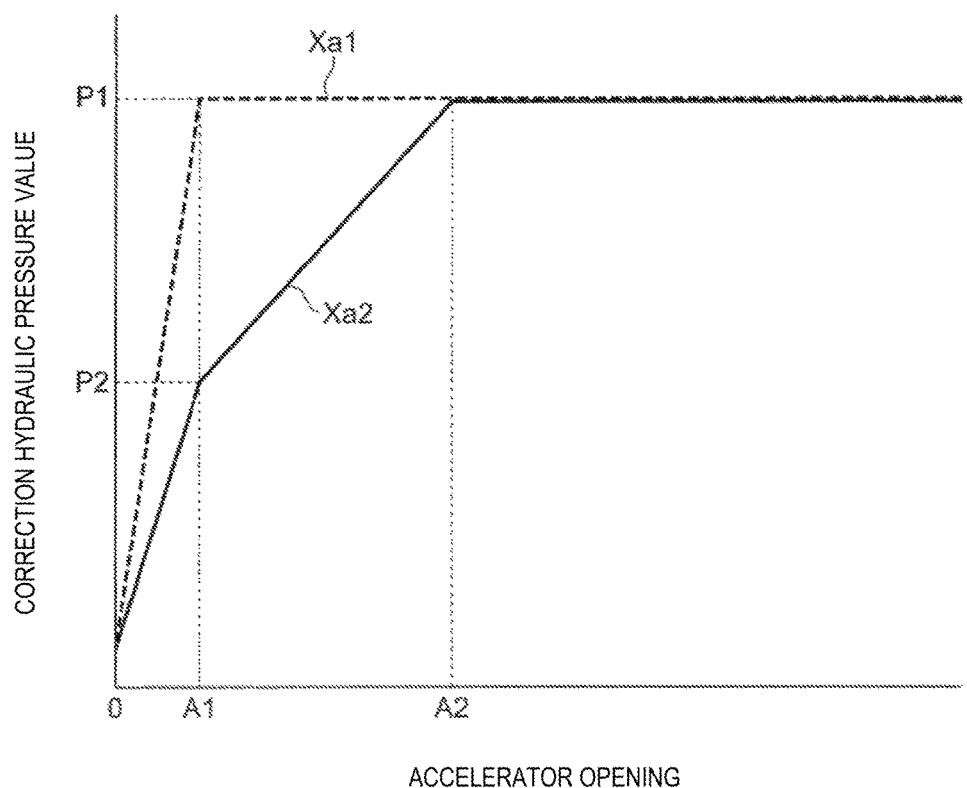
FIG. 4 is a map illustrating a correspondence between an accelerator opening and a correction hydraulic pressure value.

The first correction hydraulic pressure value Xa1 is calculated based on a map stored in the control unit 100, such as that illustrated in FIG. 4, and the input signal from the accelerator opening sensor 53. By using the input signal from the accelerator opening sensor 53, a correction excelling in responsiveness to the start request or an acceleration request by the driver is performed.

As illustrated in FIG. 4, the first correction hydraulic pressure value Xa1 is higher as the accelerator opening is larger as a whole. More specifically, within an accelerator opening range below a first opening A1, the first correction hydraulic pressure value Xa1 proportionally increases as the accelerator opening increases while remaining lower than a given first hydraulic pressure value P1, and within an accelerator opening range of the first opening A1 and above, the first correction hydraulic pressure value Xa1 is constant at the first hydraulic pressure value P1.

In the first calculation, since the first correction hydraulic pressure value Xa1 corresponding to the accelerator opening is suitably added to the first hydraulic pressure base value Xa, the first hydraulic pressure base value Xa increases as the accelerator opening increases. Therefore, the target hydraulic pressure Px obtained in the first calculation increases as the accelerator opening increases.

[Second Calculation]

On the other hand, the second calculating submodule 123 calculates the target hydraulic pressure Py when the start request for the vehicle 1 is issued in the stopped state where the neutral control and the brake hold control are executed. The second calculating submodule 123 calculates the target hydraulic pressure Py while the first frictional engageable element shifts from the slipping state to the engaged state, according to the second calculation.

Also in the second calculation, the first, second, and third hydraulic pressure base values Xa, Xb, and Xc are calculated similar to the first calculation, the target hydraulic pressure Py is calculated by performing an operation based on the hydraulic pressure base values Xa, Xb, and Xc. A similar correction to the first calculation is performed in the second calculation as needed.

Further, although the correction of the first hydraulic base value Xa according to the accelerator opening is also performed in the second calculation, a second correction hydraulic pressure value Xa2 different from the first correction hydraulic pressure value Xa1 is used in this correction.

As illustrated in FIG. 4, the second correction hydraulic pressure value Xa2 increases as the accelerator opening increases as a whole. For example, within an accelerator opening range of the first opening A1 and above but below a second opening A2, the second correction hydraulic pressure value Xa2 increases as the accelerator opening increases while remaining below the first hydraulic pressure value P1, and within an accelerator opening range of the second opening A2 and above, the second correction hydraulic pressure value Xa2 is constant at the hydraulic pressure value P1.

Within the accelerator opening range below the second opening A2, the second correction hydraulic pressure value Xa2 is lower than the first correction hydraulic pressure value Xa1. Within the accelerator opening range of the second opening A2 and above, the first and second correction hydraulic pressure values Xa1 and Xa2 are in agreement with each other at the first hydraulic pressure value P1.

More specifically, the second correction hydraulic pressure value Xa2 increases proportional to the increase of the accelerator opening within the accelerator opening range below the first opening A1 and the accelerator opening range of the first opening A1 and above but below the second opening A2. The second correction hydraulic pressure value Xa2 corresponding to the first opening A1 is a second hydraulic pressure value P2 which is lower than the first hydraulic pressure value P1.

Regarding the proportion relationship of the second correction hydraulic pressure value Xa2 with respect to the accelerator opening, a proportional constant within the accelerator opening range of the first opening A1 and above but below the second opening A2 is smaller than that within the accelerator opening range below the first opening A1.

Within the accelerator opening range below the first opening A1, a difference between the first correction hydraulic pressure value Xa1 and the second correction hydraulic pressure value Xa2 increases as the accelerator opening increases. Within the accelerator opening range of the first opening A1 and above but below the second opening A2, the difference between the first correction hydraulic pressure value Xa1 and the second correction hydraulic pressure value Xa2 increases as the accelerator opening decreases.

In the second calculation, a correction in which the second correction hydraulic pressure value Xa2 corresponding to the accelerator opening is added to the first hydraulic pressure base value Xa is suitably performed. Since the second correction hydraulic pressure value Xa2 is set lower than the first correction hydraulic pressure value Xa1 as a whole, when values of all parameters other than the correction hydraulic pressure values Xa1 and Xa2 (e.g., the target value of the engaging torque of the first frictional engageable element, the target value of the change rate of the turbine speed, the engine speed, the temperature of the hydraulic oil, the slope of the road surface, etc.) are the same, the target hydraulic pressure Py obtained in the second calculation becomes lower than the target hydraulic pressure Px obtained in the first calculation.

As described above, within the accelerator opening range of the first opening A1 and above but below the second opening A2, the difference between the first correction hydraulic pressure value Xa1 and the second correction hydraulic pressure value Xa2 is set to increase as the accelerator opening decreases. Therefore, within this accelerator opening range, a difference between the target hydraulic pressure Px obtained in the first calculation and the target hydraulic pressure Py obtained in the second calculation increases as the accelerator opening decreases.

[Operations and Effects]

The operations and effects of this embodiment are described with reference to the time chart illustrated in FIG. 5.

Figure 5:
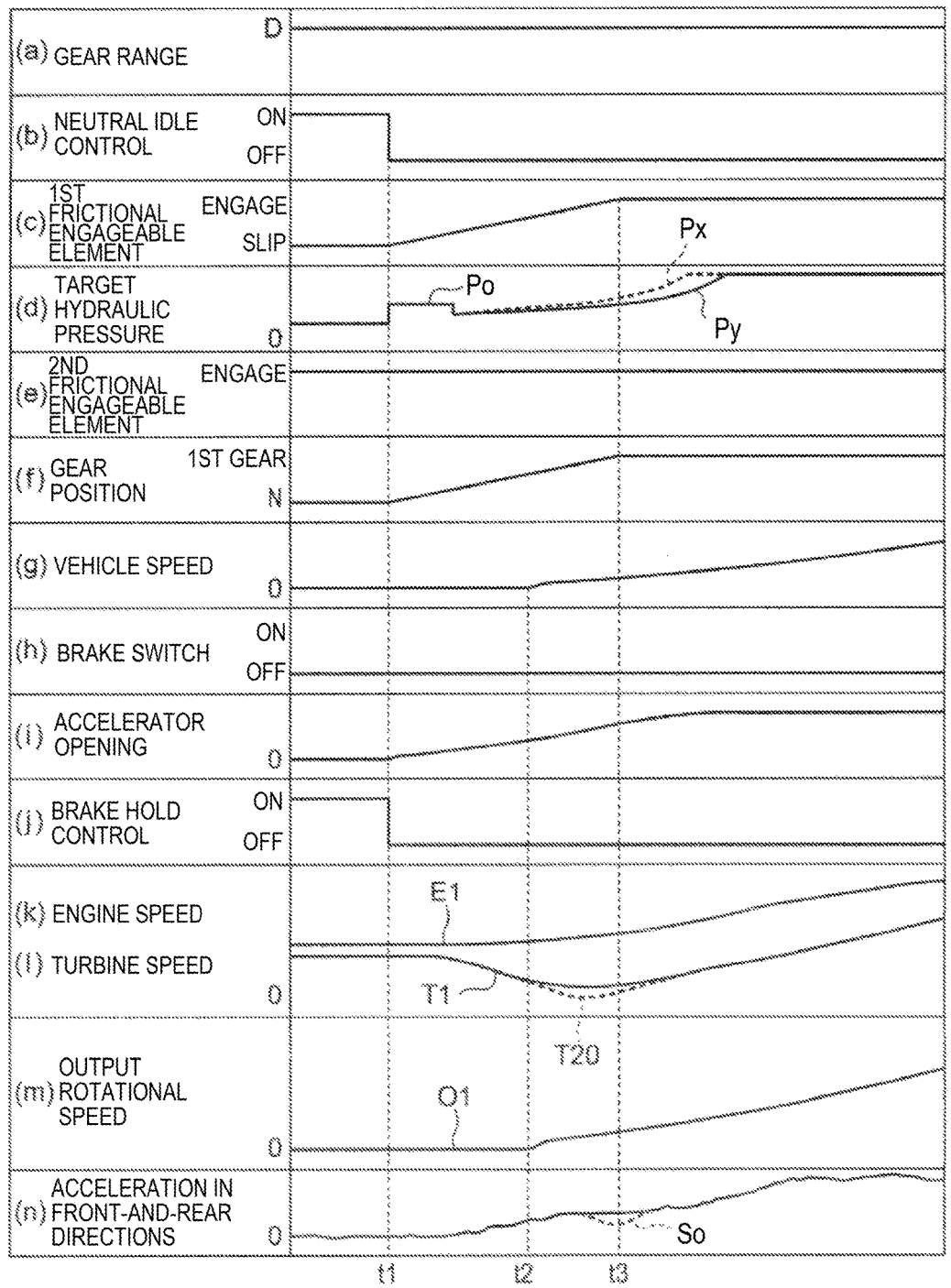
FIG. 5 is a time chart illustrating one example of changes in various elements over time in a case where the vehicle is started from a stopped state in which a neutral idle control and a brake hold control are both executed.
Figure 6:
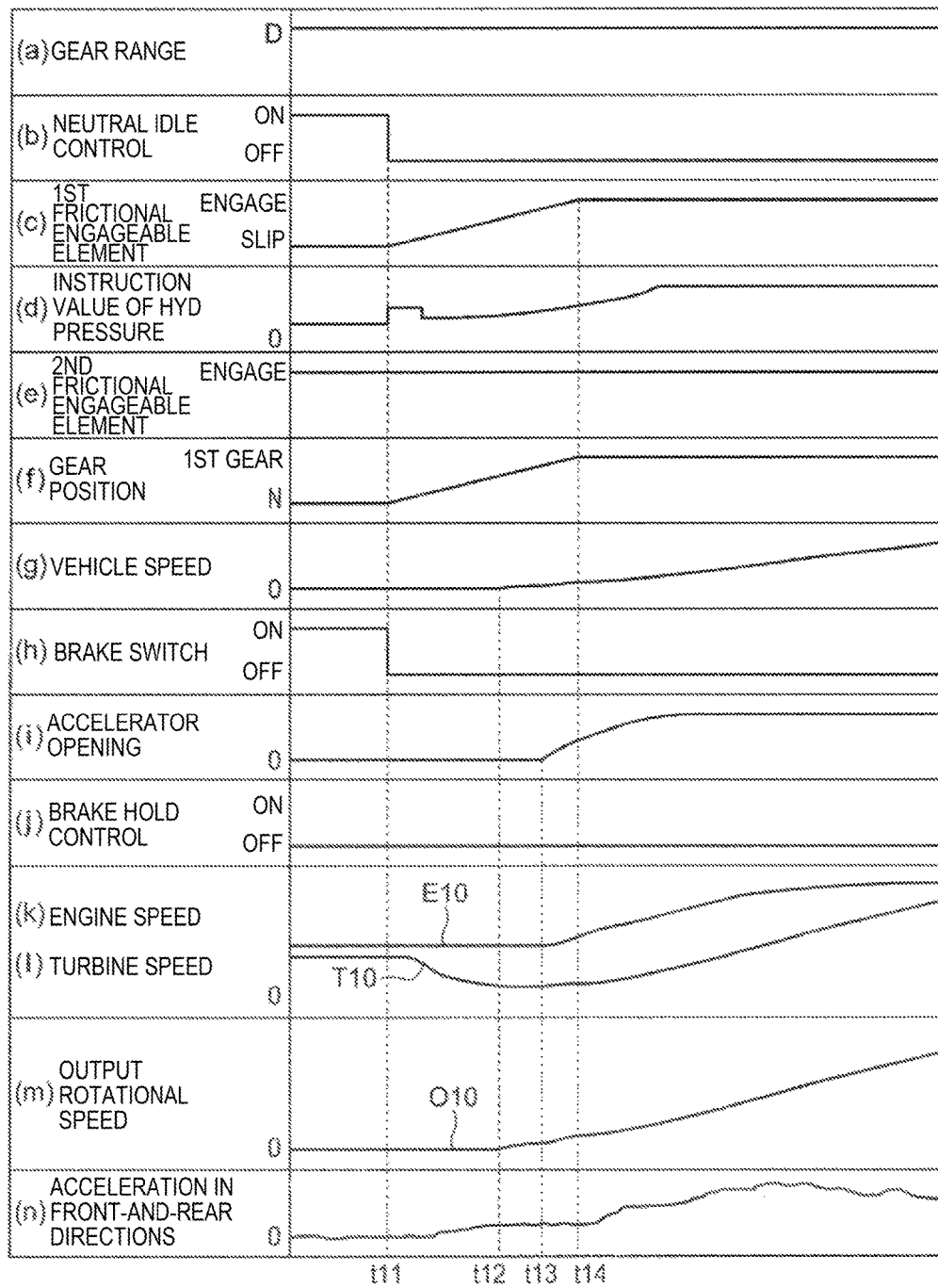
FIG. 6 is a time chart illustrating a conventional example of changes in various elements over time in a case where the vehicle is started from a stopped state where the neutral idle control is executed but the brake hold control is not executed.
Figure 7:
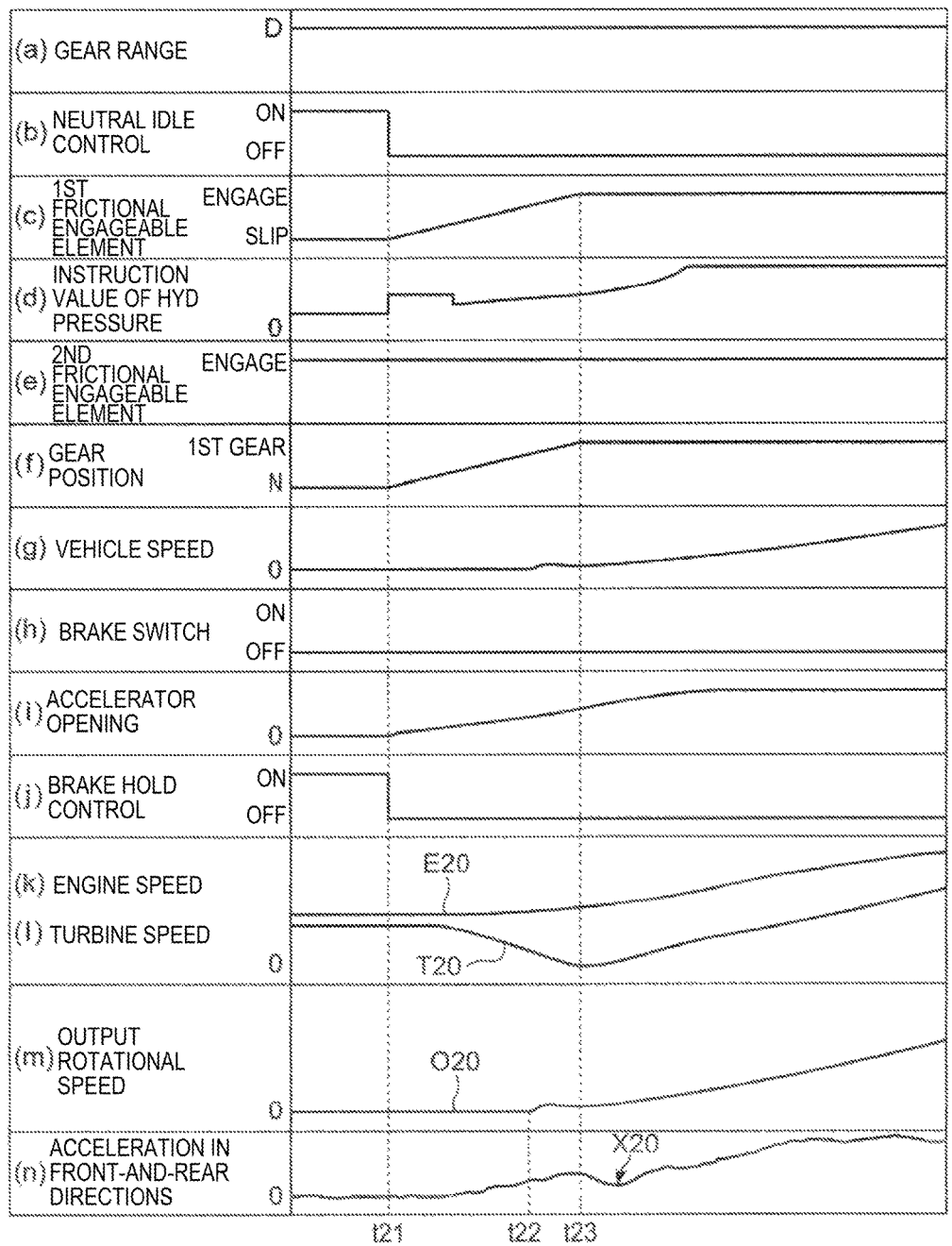
FIG. 7 is a time chart illustrating a conventional example of changes in various elements over time in the same situation as FIG. 5.

The time chart illustrated in FIG. 5 indicates one example of changes of various elements over time in a case where the vehicle 1 provided with the control system of this embodiment starts traveling from the stopped state where the neutral control and the brake hold control are executed.

As illustrated in FIG. 5, in the stopped state before time t1, the neutral control and the brake hold control are executed (Parts (b) and (j) of FIG. 5), the brake operation by the driver is released before time t1 (Part (h) of FIG. 5). In this stopped state, the start of the accelerator operation (time t1 in Part (i) of FIG. 5) triggers the start request for the vehicle 1.

Once the accelerator operation is started at time t1, the neutral control and the brake hold control are released (Parts (b) and (j) of FIG. 5).

In releasing the neutral control, the gear change from the neutral state to the starting gear position is performed. Once the gear change is started, the hydraulic pressure supply to the engaging hydraulic pressure chamber of the first frictional engageable element increases (Part (d) of FIG. 5). Thus, the first frictional engageable element gradually shifts from the slipping state to the engaged state (Part (c) of FIG. 5).

From the start of the gear change from the neutral state to the starting gear position in response to the start of the accelerator operation at time t1 until the engagement of the first frictional engageable element completes at time t3, the second calculating submodule 123 calculates the target value Py of the hydraulic pressure supplied to the first frictional engageable element in the second calculation (S4 of FIG. 3), and the hydraulic pressure controlling module 125 controls the hydraulic pressure according to the target hydraulic pressure Py (S5 of FIG. 3).

As indicated by a reference character Po of Part (d) of FIG. 5, a constant pre-charge hydraulic pressure for filling the hydraulic oil in the engaging hydraulic pressure chamber is supplied for a given period of time from time t1. After the pre-charge hydraulic pressure supply is finished, the target hydraulic pressure Py is firstly calculated to be a value lower than the pre-charge hydraulic pressure, and then is calculated to gradually increase.

When the hydraulic pressure supplied to the engaging hydraulic pressure chamber increases, eventually the torque transmission from the input side to the output side of the first frictional engageable element starts. However, although the brake hold control is released at time t1, the braking force to the wheels is not released immediately due to a required time for the hydraulic pressure to be discharged from the engaging hydraulic pressure chamber. Therefore, even when the torque transmission is started in the first frictional engageable element, the stopped state is maintained until the braking force to the wheels is released (Part (g) of FIG. 5).

At time t2, once the braking force is released and the vehicle 1 starts traveling (Part (g) of FIG. 5), an output rotational speed O1 of the automatic transmission 6 starts increasing (Part (m) of FIG. 5).

As illustrated in Part (d) of FIG. 5, the target hydraulic pressure Py is, for example, lower than the target hydraulic pressure Px obtained in the first calculation. That is, the increase of the target hydraulic pressure Py delays compared to that of the target hydraulic pressure Px, for example. Note that regarding the pre-charge hydraulic pressure (see the reference character Po), the target hydraulic pressure Py obtained in the second calculation may be the same as the target hydraulic pressure Px obtained in the first calculation.

By supplying the hydraulic pressure corresponding to the relatively-low target value Py as described above to the engaging hydraulic pressure chamber, the engagement of the first frictional engageable element is delayed. Therefore, the output rotational speed O1 of the automatic transmission 6 when engaging the first frictional engageable element is higher than when executing the hydraulic control according to the target hydraulic pressure Px obtained in the first calculation.

Therefore, as illustrated in Part (1) of FIG. 5, the decrease amount of the turbine speed T1 for engaging the first frictional engageable element and its decrease rate are reduced compared to when executing the hydraulic control according to the target hydraulic pressure Px obtained in the first calculation (see a reference character T20 of Part (1) of FIG. 5). As a result, at time t3, the first frictional engageable element is engaged while the turbine speed T1 gradually decreases, i.e., while the input-side inertia is relatively small.

Therefore, according to this embodiment, the shock from engaging the first frictional engageable element is effectively prevented. Thus, for example, as illustrated in Part (n) of FIG. 5, when an acceleration in the front-and-rear directions of the vehicle 1 is measured continuously, in a case where the hydraulic control is executed based on the first calculation, a possible drop of the acceleration (see a reference character So) is effectively prevented in this embodiment.

Further in this embodiment, although an inertial mass on the input side (engine 2 side) of the first frictional engageable element increases due to the centrifugal pendulum damper 18 being provided in the drive force transmission path extending from the engine 2 to the automatic transmission 6, the inertia on the input side is effectively reduced as described above. Therefore, the shock from engaging the first frictional engageable element is effectively prevented.

As illustrated in Part (i) of FIG. 5, from the start of depression of the accelerator pedal 42 in the stopped state (time t1) until the gear change to the starting gear position is completed (time t3), the depression amount of the accelerator pedal 42 is normally increased gradually. Therefore, the accelerator opening from time t1 to time t3 tends to be relatively small.

As illustrated in FIG. 4, within the accelerator opening range below the second opening A2, the hydraulic pressure supply to the first frictional engageable element is reduced by using the second calculation, and therefore, the shock prevention within this accelerator opening range is achieved.

Incidentally, when the depression amount of the accelerator pedal 42 is small and the accelerator opening is small, the sensitivity to the shock caused by the engagement tends to become high. In this embodiment, within the accelerator opening range of the first opening A1 and above but below the second opening A2, the difference between the first correction hydraulic pressure value Xa1 and the second correction hydraulic pressure value Xa2 increases as the accelerator opening decreases (see FIG. 4).

Thus, according to this embodiment, within the accelerator opening range of the first opening A1 and above but below the second opening A2, the hydraulic pressure reduction amount due to using the second calculation increases as the accelerator opening is smaller. Therefore, within this accelerator opening range, the shock preventing effect by using the second calculation is enhanced as the shock sensitivity is higher. Therefore, in the case where the engagement of the first frictional engageable element completes within this accelerator opening range, the shock prevention described above is effectively achieved.

Although the present disclosure is described by raising the embodiment as described above, it is not limited to this embodiment.

For example, although in the above embodiment, the example in which the first frictional engageable element is subjected to the slip control while the neutral control is executed is described, the first frictional engageable element may be in the disengaged state other than the slipping state, i.e., a small clearance state where the clutch clearance is extremely small or the completely released state while the neutral control is executed.

Moreover, although in the above embodiment, the example in which the target hydraulic pressure Py obtained in the second calculation is lower than the target hydraulic pressure Px obtained in the first calculation within a part of the entire accelerator opening range is described, the target hydraulic pressure Py obtained in the second calculation may be lower than the hydraulic pressure Px obtained in the first calculation over the entire accelerator opening range.

Further, although in the above embodiment, the vehicle 1 including the multi-step transmission mechanism is described, the automatic transmission of the vehicle to which the present disclosure is applied may be a continuously variable transmission as long as it has a frictional engageable element for starting the vehicle.

Furthermore, although in the above embodiment, the drive source of the vehicle 1 is configured as the engine 2 including the cylinder suspending mechanism 3 and in which the number of cylinders operated is controllable is described, the drive source of the vehicle to which the present disclosure is applied may be an engine without the cylinder suspending mechanism 3 or a drive source other than the engine, for example, a motor. The present disclosure may also be applied to vehicles including a plurality of drive sources.

Additionally, although in the above embodiment, the example in which the centrifugal pendulum damper 18 is attached to the turbine 13 is described, in the present disclosure, the centrifugal pendulum damper may be provided at a position in the torque converter other than the turbine, or a position in the drive force transmission path extending from the drive source to the transmission mechanism, other than the torque converter. The present disclosure may be applied to a vehicle without the centrifugal pendulum damper.

As described above, according to the present disclosure, when the vehicle starts from the stopped state in which the neutral idle control and the brake hold control are executed, the shock caused by engaging the frictional engageable element for starting the vehicle is effectively prevented. Therefore, the present disclosure may suitably be used in a manufacturing industrial field of vehicles on which an automatic transmission is mounted.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle
2 Engine (Drive Source)
3 Cylinder Suspending Mechanism
4 Torque Converter
6 Automatic Transmission
10 Drive Wheel
18 Centrifugal Pendulum Damper
30 Brake Device
41 Brake Pedal (Brake Controller)
42 Accelerator Pedal
59 Brake Hold Selecting Switch (Brake Hold Controller)
70 Hydraulic Control Device
100 Control Unit
110 Transmission Controlling Module
120 Neutral Idle Controlling Module
121 Hydraulic Pressure Calculating Module
122 First Calculating Submodule
123 Second Calculating Submodule
125 Hydraulic Pressure Controlling Module
130 Brake Hold Controlling Module

What is claimed is:

1. A control system of a vehicle, comprising:
an automatic transmission having a frictional engageable element configured to be engaged when starting the vehicle to travel;
a brake controller that is operated by a vehicle driver to apply a braking force to vehicle wheels; and
a processor configured to execute:
a neutral idle controlling module to execute, when a given neutral idle condition is satisfied in a vehicle stopped state where a gear range of the automatic transmission is a traveling range, a neutral idle control in which the frictional engageable element is disengaged to bring the automatic transmission into a neutral state, and to release the neutral idle control when a vehicle start request is issued;
a hydraulic pressure calculating module to calculate, while the neutral idle control is executed or when the neutral idle control is to be released, a target value of hydraulic pressure supplied to an engaging hydraulic pressure chamber of the frictional engageable element according to a value of a given parameter;
a hydraulic pressure controlling module to control the hydraulic pressure supplied to the engaging hydraulic pressure chamber according to the target value calculated by the hydraulic pressure calculating module; and
a brake hold controlling module to execute, when a given brake hold condition is satisfied in the vehicle stopped state, a brake hold control in which the braking force to the vehicle wheels is held regardless of the brake controller not being operated, and to release the brake hold control when the vehicle start request is issued,
wherein the hydraulic pressure calculating module includes:
a first calculating submodule executed to calculate the target value according to a first calculation, in a period from the issuance of the vehicle start request when the neutral idle control is executed and the brake hold control is not executed in the vehicle stopped state until the frictional engageable element is engaged; and
a second calculating submodule executed to calculate the target value according to a second calculation configured so that a calculated value is lower than in the first calculation when the value of the given parameter is the same, in a period from the issuance of the vehicle start request when the neutral idle control and the brake hold control are executed in the vehicle stopped state until the frictional engageable element is engaged.

2. The control system of claim 1, wherein the first calculation is configured so that the calculated target value becomes higher as an opening of an accelerator pedal increases, and the second calculation is configured so that the calculated target value becomes lower than in the first calculation within a given accelerator opening range.

3. The control system of claim 2, wherein, within the given accelerator opening range, a difference between the target value obtained in the first calculation and the target value obtained in the second calculation increases as the accelerator opening decreases.

4. The control system of claim 1, further comprising a brake hold controller that is operated by the vehicle driver to select one of permission and refusal of execution of the brake hold control.

5. The control system of claim 1, wherein a centrifugal pendulum damper is provided in a drive force transmission path extending from a drive source to the frictional engageable element.

6. The control system of claim 5, wherein the automatic transmission is connected to the drive source via a torque converter, and the centrifugal pendulum damper is provided inside a casing of the torque converter.

7. The control system of claim 5, wherein the drive source includes a cylinder-activation control engine including a plurality of cylinders and suspendable of one or some of the cylinders.

* * * * *